United States Patent
Meglan et al.

(10) Patent No.: US 12,440,286 B2
(45) Date of Patent: Oct. 14, 2025

(54) PARTIAL REUSABLE ROBOT PERFORMING ENDO-TOOL MANIPULATION

(71) Applicant: Foreveryoung Technology Corporation, Lincoln, MA (US)

(72) Inventors: Dwight Alan Meglan, Westwood, MA (US); Yunfei Cao, Lincoln, MA (US); Ann Xin, Newark, CA (US)

(73) Assignees: Foreveryoung Technology Corporation; Tonglu Technology Co., Ltd, Shenzhen (CN)

( * ) Notice: Subject to any disclaimer, the term of this patent is extended or adjusted under 35 U.S.C. 154(b) by 524 days.

(21) Appl. No.: 17/825,630

(22) Filed: May 26, 2022

(65) Prior Publication Data

US 2023/0380914 A1  Nov. 30, 2023

(51) Int. Cl.
*A61B 34/30* (2016.01)
*A61B 34/00* (2016.01)
*B25J 9/10* (2006.01)

(52) U.S. Cl.
CPC .............. *A61B 34/30* (2016.02); *A61B 34/70* (2016.02); *B25J 9/10* (2013.01); *A61B 2034/301* (2016.02)

(58) Field of Classification Search
CPC ... A61B 34/30; A61B 34/70; A61B 2034/301; A61B 34/35; A61B 34/73; A61N 2/00
See application file for complete search history.

(56) References Cited

U.S. PATENT DOCUMENTS

| | | | |
|---|---|---|---|
| 2015/0150637 A1* | 6/2015 | Iwasa | A61B 34/73 600/417 |
| 2016/0016320 A1* | 1/2016 | Rothfuss | A61B 34/30 74/490.06 |
| 2017/0348060 A1* | 12/2017 | Blacker | A61M 25/0113 |
| 2022/0133425 A1* | 5/2022 | Huang | B25J 9/102 206/363 |
| 2022/0226619 A1* | 7/2022 | Huang | A61B 90/10 |
| 2022/0233264 A1* | 7/2022 | Klem | A61B 34/37 |
| 2022/0233820 A1* | 7/2022 | Clark | A61M 25/0113 |
| 2022/0296315 A1* | 9/2022 | Sokhanvar | A61B 34/10 |

* cited by examiner

*Primary Examiner* — Julian W Woo
*Assistant Examiner* — Raihan R Khandker
(74) *Attorney, Agent, or Firm* — C. Tricia Liu

(57) ABSTRACT

Herein disclosed is a robot apparatus for inserting or removing an endo-tool into or from a clinical subject. The robot apparatus includes a robot moving hand configured to move linearly towards or away from the clinical subject. The moving hand further includes a moving hand actuator being controlled by a surgical operator in a distance and a manipulator configured to maneuver the endo-tool to be inserted to or withdrawn from a clinical subject. The robot apparatus also includes a robot stationary hand being linearly stationary between the clinical subject and the moving hand. A sterile barrier is configured to separate a sterile side from a non-sterile side with the moving hand actuator, the stationary hand actuator being on the non-sterile side, and the manipulator and the clamp being on the sterile side.

14 Claims, 14 Drawing Sheets

PARTIAL REUSABLE ROBOT PERFORMING ENDO-TOOL MANIPULATION

TECHNICAL FIELD

This application relates generally to medical robot apparatus, particularly to robot apparatus performing catheter or endo-tool manipulation on a clinical subject.

BACKGROUND

In existing practice, during an operation involving the use of a catheter, the operator must stand near a clinical subject to manipulate, for example, an endo-tool, such as a guidewire, guide catheter, or angioplasty catheter, into or out of the clinical subject including the vascular system. Due to many clinical procedures involving operators spending extended amounts of time standing by the clinical subject while using a fluoroscope, long term exposure to radiation is not desirable. Multiple shifts or limited hours are often applied in order to stay within the exposure requirements which increase the operational cost yet still subject operators to the undesirable conditions.

In addition, not separating between the sterile parts coming into contact with sterile patient and the non-sterile portion of the surgical devices proves to be extremely costly because the non-sterile portions are often expensive mechanical driving gears that cannot be re-sterilized and must be discarded after a single use. Even if re-sterilization of the mechanical driving gears is possible, it is often prohibitively expensive.

Furthermore, robotic or electromechanical devices in existing practice performing catheter operations are bulky and expensive.

It therefore demands the sterile parts to be smaller, inexpensive and driven by the non-sterile driving gears, which may be expensive and reusable. It also demands a robot apparatus with contactless control of the manipulation of the endo-tool that allows for remote control by the operator or other automatic controls.

Accordingly, herein disclosed methods and apparatus are directed to solve one or more problems set forth above and other problems.

SUMMARY

In accordance with a first aspect of the present disclosure, there is set forth herein disclosed a robot apparatus for inserting or removing an endo-tool into or from a clinical subject. The robot apparatus includes a robot moving hand configured to move linearly towards or away from the clinical subject. The moving hand further includes a moving hand actuator being controlled by a surgical operator in a distance and a manipulator configured to maneuver an endo-tool to be inserted to or withdrawn from a clinical subject. The robot apparatus also includes a robot stationary hand being linearly stationary between the clinical subject and the moving hand. The robot stationary hand includes a clamp to either hold or release the endo-tool being threaded through the clamp. The manipulator is contactlessly controlled by the moving hand actuator as well as the clamp is contactlessly controlled by a stationary hand actuator. A sterile barrier is configured to separate a sterile side from a non-sterile side with the moving hand actuator and the stationary hand actuator being on the non-sterile side, and the manipulator and the clamp being on the sterile side.

In accordance with a second aspect of the present disclosure, there is set forth a herein disclosed method of providing a robot apparatus for inserting or removing an endo-tool into or from a clinical subject. The method includes providing a robot moving hand configured to move linearly towards or away from the clinical subject. The method further includes providing a moving hand actuator being controlled by a surgical operator in a distance and a manipulator configured to maneuver the endo-tool to be inserted to or withdrawn from a clinical subject. The method also includes providing a robot stationary hand being linearly stationary between the clinical subject and the moving hand, with the robot stationary hand including a clamp to either hold or release the endo-tool passing through the clamp. The manipulator is contactlessly controlled by the moving hand actuator as well as the clamp is contactlessly controlled by a stationary hand actuator. The method yet further includes providing a sterile barrier which is configured to separate a sterile side from a non-sterile side with the moving hand actuator and the stationary hand actuator being on the non-sterile side, and the manipulator and the clamp being on the sterile side.

In an example, the clamp of the robot stationary hand is magnetically coupled to and controlled by the stationary hand actuator, which is an electric magnetic device.

Yet in another example, the moving hand actuator includes at least one magnetic driving gear and the manipulator includes at least one magnetic manipulation gears corresponding to the magnetic driving gears.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosed systems and methods and are not intended as limiting. For purposes of clarity, not every component may be labeled in every drawing. In the following description, various embodiments are described with reference to the following drawings.

DETAILED DESCRIPTION

List of Nomenclatures

Figure 1:
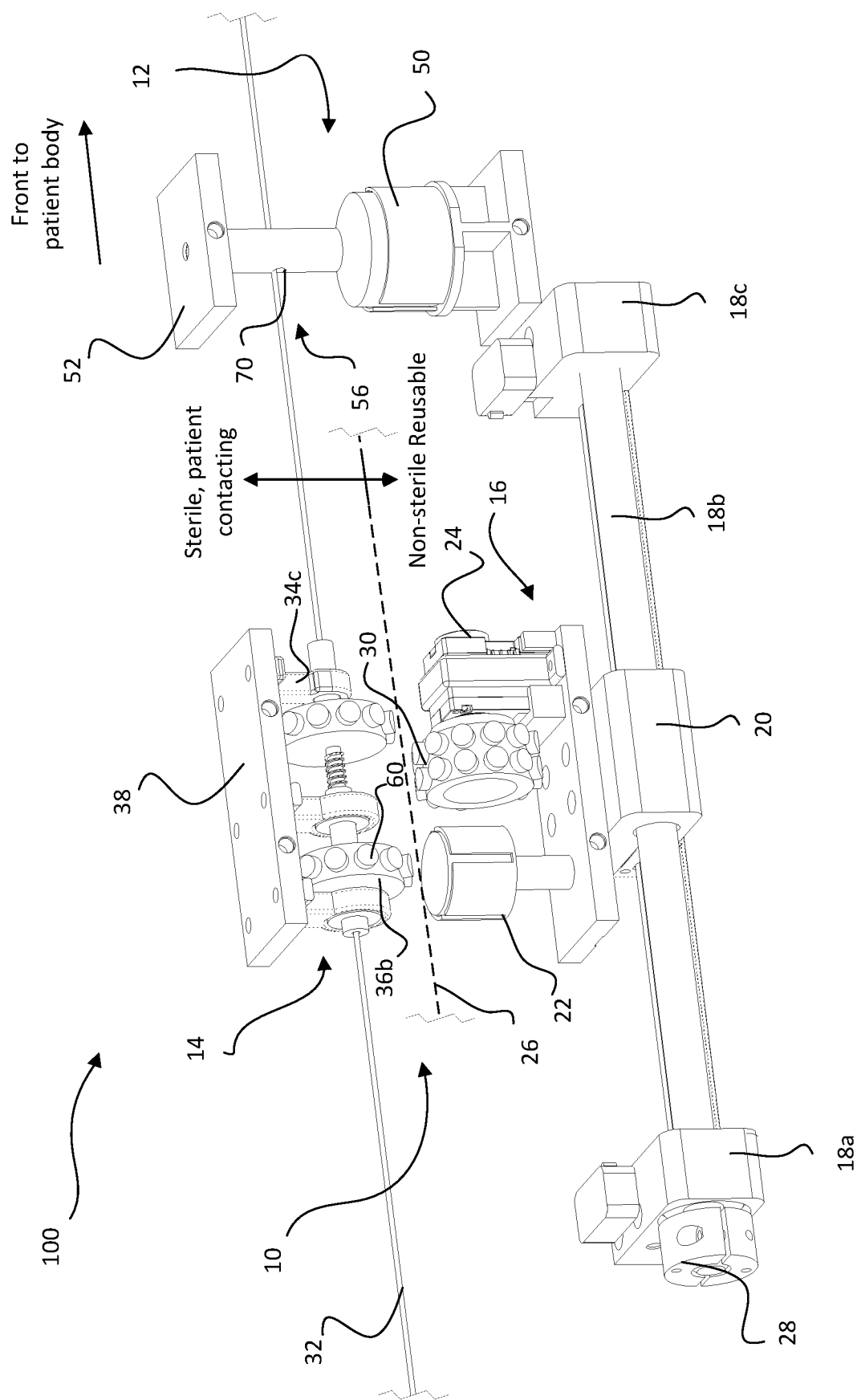
FIG. 1 is an exploded perspective view of a robot apparatus for operation of an endo-tool on a clinical subject in accordance with the present disclosure.

Numerals corresponding to those shown in the drawings are listed in Table-1. Terms assigned to corresponding numerals are also given in Table-1.

TABLE 1

Numerals and corresponding terms used in the present disclosure

| | |
|---|---|
| 10 | robot moving hand |
| 12 | robot stationary hand |
| 14 | moving hand manipulators |
| 15 | moving hand manipulator housing |
| 16 | moving hand actuator |
| 18a | backend track stand |
| 18b | track |
| 18c | frontend track stand |
| 20 | actuator platform |
| 22 | platform electric magnet |
| 24 | actuator motor |
| 26 | sterile barrier |
| 28 | track motor coupler |
| 30 | magnetic driving gear |
| 32 | endo-tool |
| 34a, b, c, | hanger bearing |
| 36a | moving hand rotating gear |
| 36b | moving hand holding gear |
| 38 | moving hand hanger support |
| 40 | collet chuck |

TABLE 1-continued

Numerals and corresponding terms used in the present disclosure

| | |
|---|---|
| 42 | collet nozzle |
| 44 | collet tweezers |
| 46 | collet barrel |
| 48a | collet spindle |
| 48b | collet inner gear |
| 50 | stationary hand electric magnet |
| 52 | stationary hand roof support |
| 54a | stationary hand clamp cylinder |
| 54b | stationary hand clamp magnet |
| 56 | stationary hand manipulator |
| 58 | stationary hand clamp housing |
| 60 | gear permanent magnets |
| 62 | endo-tool bearing |
| 64 | moving hand housing fastener |
| 66 | base housing |
| 68 | stationary hand clamp housing fastener |
| 70 | stationary hand clamp |
| 72 | stationary housing fasteners |
| 80a | backend position sensor |
| 80b | frontend position sensor |

The forgoing description of the partially reusable robot apparatus can be used for insertion or removal of endo-tools, as an example. It should be appreciated that the scope and spirit of this disclosure is not limited to this example. The terms of "robot moving hand" and "moving hand" can be interchangeably used. Similarly for the terms of "robot stationary hand" and "stationary hand". It also be appreciated that term "endo-too" can refer to any one of the shapes or objects of a catheter, a guidewire, a guide catheter, an angioplasty catheter, or an endoscope.

FIG. 1 is an exploded perspective view of a robot apparatus for operation of an endo-tool on a clinical subject in accordance with the present disclosure. For the clarity of the overall operational environment of the robot apparatus, some elements not shown in the drawings, are important to the present disclosure. These include a clinical subject to the far righthand side (front side) of the diagram of FIG. 1, and a sterile barrier enveloping the whole moving hand actuator 16, shown as a line sterile barrier 26 but rather is an enveloping barrier.

As shown in FIG. 1, robot apparatus 100 according to the present disclosure comprises a robot moving hand 10 and a robot stationary hand 12. Robot moving hand 10 is configured to move linearly on a track 18*b* towards or away from the clinical subject, which is not shown but situated further to the far righthand side of the diagram. Robot moving hand 10, or the moving hand, for short, further comprises a moving hand actuator 16 and a moving hand manipulator 14. Moving hand actuator 16 may have one or two sub-actuators, each of which is controlled by a surgical operator (not shown), preferably by means of remote controls. Moving hand manipulator 14 maneuvers an endo-tool 32 to be inserted to or withdrawn from the clinical subject, being contactlessly controlled by moving hand actuator 16. A force linearly along endo-tool 32 and/or a torquing axial rotation on endo-tool 32 are applied to achieve the above.

The robot apparatus 100 also includes a robot stationary hand 12, which is linearly stationary between the clinical subject and robot moving hand 10. Robot stationary hand 12 is configured to be stationary relative to the clinical subject and track 18*b*. Robot stationary hand 12 is configured to either hold or release the endo-tool that is threaded through it. The holding mechanism can be a magnet clamp controlled contactlessly by a stationary hand electric magnet 50.

Figure 2:
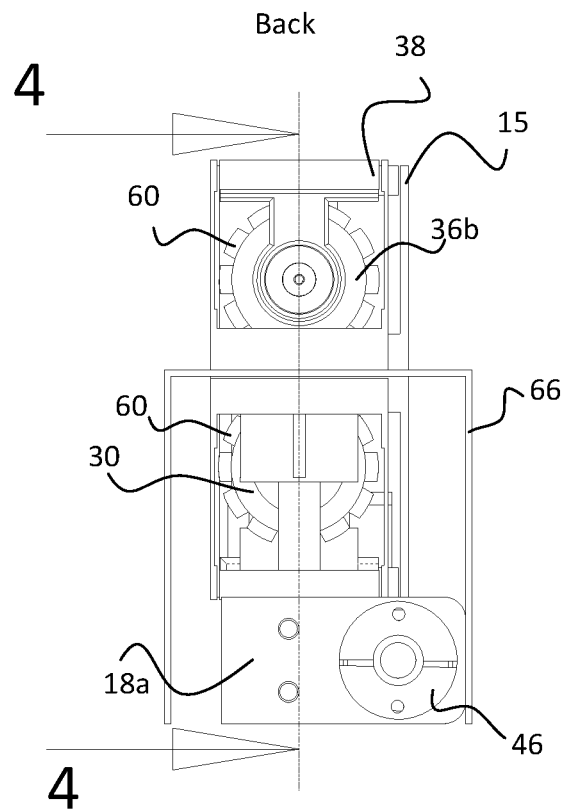
FIG. 2 is a back view of the robot apparatus for operation of an endo-tool on a clinical subject in accordance with the present disclosure.
Figure 3:
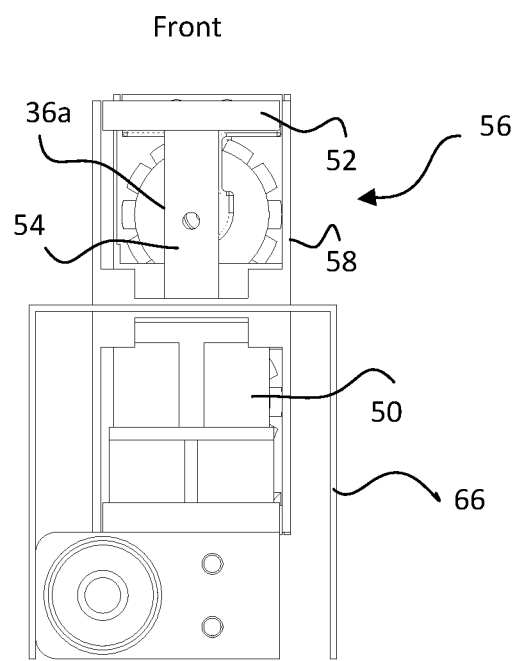
FIG. 3 is a front view of the robot apparatus for operation of an endo-tool on a clinical subject in accordance with the present disclosure.
Figure 4:
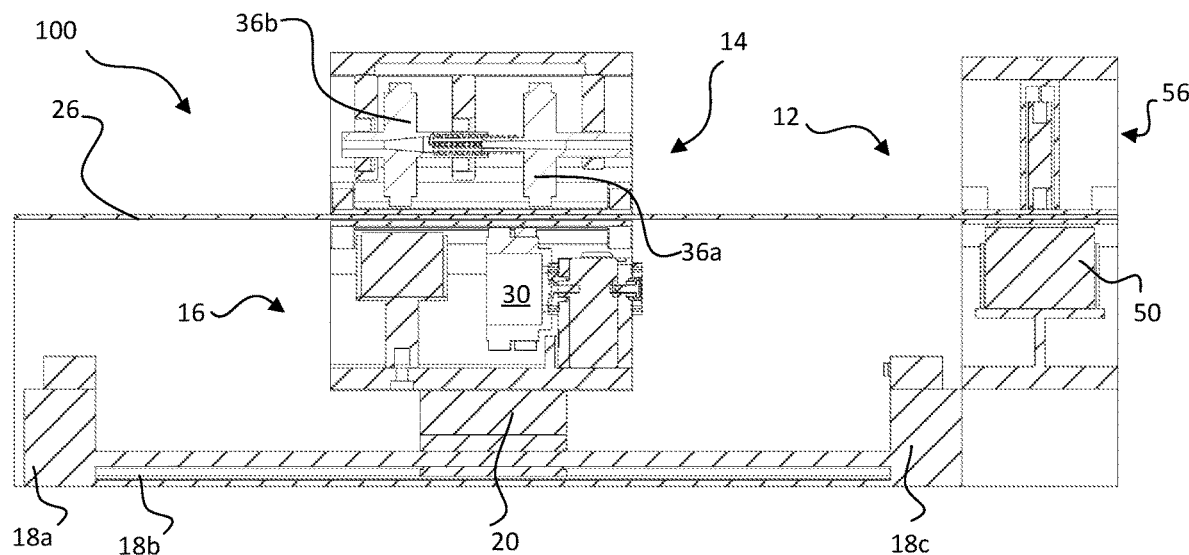
FIG. 4 is a cross-sectional view of the robot apparatus for operation of an endo-tool on a clinical subject in accordance with the present disclosure.
Figure 5:
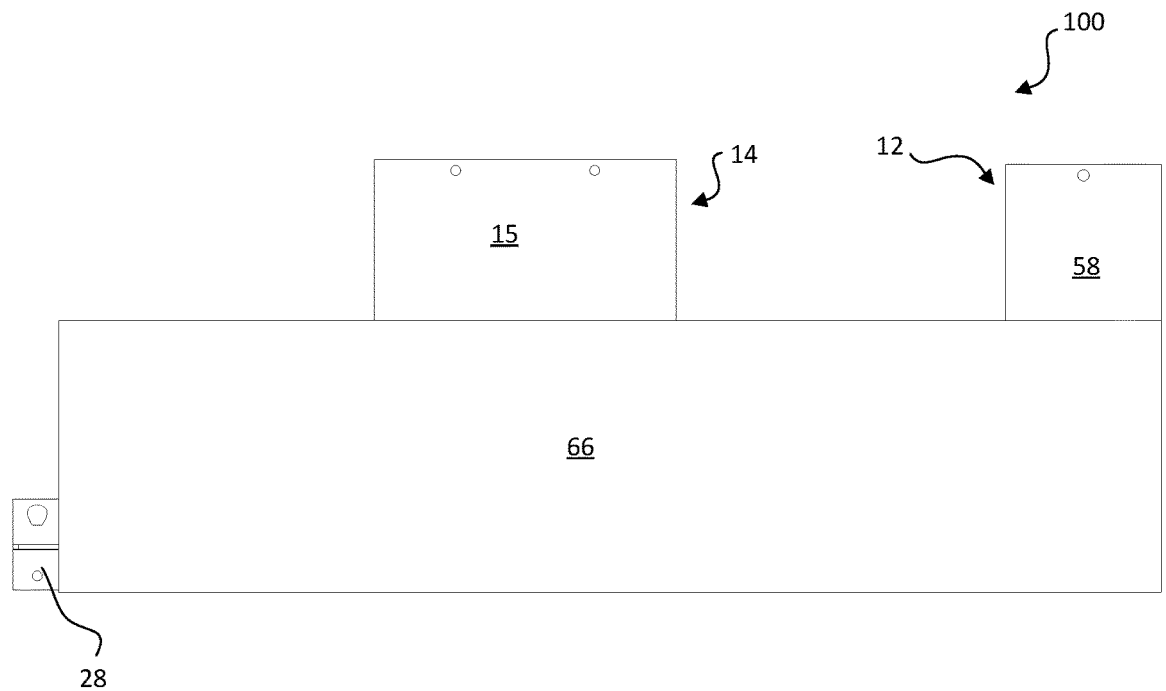
FIG. 5 is a side view of the housing of the robot apparatus for operation of an endo-tool on a clinical subject in accordance with the present disclosure.

FIG. 2 is a back view of the robot apparatus for operation of an endo-tool on a clinical subject in accordance with the present disclosure. FIG. 3 is a front view of the robot apparatus for operation of an endo-tool on a clinical subject in accordance with the present disclosure. FIG. 4 is a cross-sectional view of the robot apparatus for operation of an endo-tool on a clinical subject in accordance with the present disclosure. FIG. 5 is a side view of the housing of the robot apparatus for operation of an endo-tool on a clinical subject in accordance with the present disclosure.

Referring to FIGS. 1, 4 and 5, a sterile barrier 26 configured to separate a sterile side from a non-sterile side, as shown in FIG. 1, is used to wrap moving hand actuator 16 and stationary hand electric magnet 50 in a sterilely concealed or blocking manner. This is to prevent anything crossed from non-sterile side to the sterile side as shown in FIG. 1. Furthermore, body fluid or contamination from 14 or stationary hand clamp 70 is prevented from entering into the non-sterile side as well. As can be seen, moving hand actuator 16 and stationary hand electric magnet 50 are on the non-sterile side, and 14 and stationary hand clamp 70 are on the sterile side, contacting patients or the clinical subject. Manipulator housing 15 and stationary hand clamp housing 58 come to the clinical procedure pre-sterilized and stay sterile. Base housing 66 is on the non-sterile side and stays underneath a sterile barrier 26. A disposable sterile barrier 26 is preferably to be changed for each patient or clinical subject.

As shown in FIGS. 1-5, 14 is housed in a manipulator housing 15, with a moving hand hanger support 38, preferably on the top. Moving hand actuator 16 is housed in a base housing 66. Track 18b is supported by backend track stand 18a and frontend track stand 18c, and an actuator platform 20 carrying moving hand actuator 16 moves between backend track stand 18a and track 18b. A track motor coupler 28 or a pair of track motor couplers 28 move a transfer system such as a link, line or belt (not show) to carry actuator platform 20 back and forth between backend track stand 18a and frontend track stand 18c.

Referring to FIGS. 1 and 3, stationary hand electric magnet 50 is housed by base housing 66 as well, on the reusable non-sterile side. An upper part of robot stationary hand 12 comprises a stationary hand manipulator 56, which is housed by stationary hand clamp housing 58. Stationary hand clamp housing 58 comprises a stationary hand roof support 52 which supports stationary hand clamp cylinder 54a.

In comparison to the existing art operation operated without robot apparatus 100, an operator must stand near the clinical subject, in place of robot apparatus 100, to manipulate the endo-tool into or out of the clinical subject. Due to many clinical procedures that can require extensive use of x-ray based fluoroscopes, long term exposure to radiation needs to be prevented. Limiting hours of exposure leads to the need for more people on more shifts which increases operational costs while subjecting operators to undesirable working situations.

In order to facilitate the explanation of the operation of robot apparatus 100, manual operations in the existing art is herein referred to as a comparison. Manually, operator usually stands to the left of the clinical subject in FIG. 1 (not shown), in place of robot apparatus 100, to manipulate endo-tool 32 into or out of the clinical subject. The insertion of endo-tool 32 involves mainly two kinds of forces. One is the force of pushing/pulling the axially stiff and bending flexible endo-tool 32, the other is the torquing of the rotationally stiff endo-tool 32, often while pushing. The operation involves the coordination of two hands of the operator to transfer endo-tool 32 more into the clinical subject, or more out from the clinical subject.

More specifically, for example, assuming the operator stands with his/her back facing the reader of FIG. 1, during the insertion of endo-tool 32, the operator lets the right hand open to release endo-tool 32. At the same time, the operator uses the left hand (sometimes both hands) to push, pull or torque the rigidly flexible endo-tool 32. When one segment of endo-tool 32 is pushed into the clinical subject, resulting in the left hand being moved closer to the right hand, the operator would need to close the right hand, holding endo-tool 32 to not move, and at the same time, move release and move the left hand further down to the left to allow if to be ready to push and/or rotate the next segment of endo-tool 32 into the clinical subject. Similar coordination among the left hand and the right hand applies during the process of removing endo-tool 32 from the clinical subject. That is, during the time the left hand is pulling or torquing, the right hand is open and lets loose endo-tool 32. During the time the left hand is transferring from one segment of endo-tool 32 to another, the right hand is closed, stopping endo-tool 32 from moving while the left hand repositions to facilitate the continued withdrawal of the endo-tool, such as a catheter line.

Therefore, the embodiments of robot apparatus 100 according to the present disclosure are configured to mimic and achieve the function of the two hands closely to the above-described manner, in a simple and effective way. And very importantly, robot apparatus 100 is configured in a way separating the parts on the sterile side from the non-sterile side. This allows for contactless control of the manipulation of the endo-tool and prevents some expensive parts from being contaminated and allows them to be reused from one clinical procedure to another. Furthermore, this allows for robot apparatus 100 to replace the human operator, negating the issues of radiation exposure and extending the time span of each operator operating when they are working remotely. Yet furthermore, this potentially removes the geographical limitations placed on operators who have the expertise on the procedure.

In light of the above, robot moving hand 10 of robot apparatus 100 according to the present disclosure is configured to perform the functions of, 1) holding endo-tool 32 to push or pull endo-tool 32; 2) holding and rotate endo-tool 32.

Referring to FIGS. 1-5, robot moving hand 10 includes moving hand manipulator 14 and moving hand actuator 16. In an example embodiment, moving hand manipulator 14 is configured to maneuver endo-tool 32 to be inserted to or withdrawn from the clinical subject, being contactlessly controlled by moving hand actuator 16. To achieve such, moving hand manipulator 14 is configured to have a moving hand rotating gear and moving hand holding gear 36b, each is respectively supported by a hanger bearing 34c and a hanger bearing 34a, which are attached to a moving hand hanger support 38. Moving hand hanger support 38 is a part of or fixed to a roof top of a collet chuck 40 (FIG. 5).

In this example embodiment, moving hand actuator 16 comprises two sub-actuators, one platform electric magnet 22, the other a magnetic driving gear 30 driven by actuator motor 24, both of which are controlled by a surgical operator (not shown), preferably by means of remote controls. Moving hand rotating gear and moving hand holding gear are contactlessly controlled by magnetic driving gear 30 and platform electric magnet 22 respectively to maneuver endo-tool 32 to be inserted to or withdrawn from the clinical subject.

As can be seen in FIGS. 1 and 2, a plurality of gear permanent magnets 60 are attached to moving hand rotating gear, moving hand holding gear 36b, and magnetic driving gear 30. The control of magnetic driving gear 30 on moving hand rotating gear is achieved by magnetic force paired up between corresponding gear permanent magnets 60 on moving hand holding gear 36b and magnetic driving gear 30, without magnetic driving gear 30 coming into contact to moving hand holding gear 36b. Platform electric magnet 22 is controlled by a surgical operator (not shown). Similarly, the control of platform electric magnet 22 on moving hand holding gear 36b is achieved by the magnetic force between the magnetic field of platform electric magnet 22 and gear permanent magnets 60 on moving hand holding gear 36b, without platform electric magnet 22 coming into contact with moving hand holding gear 36b.

Figure 6A:
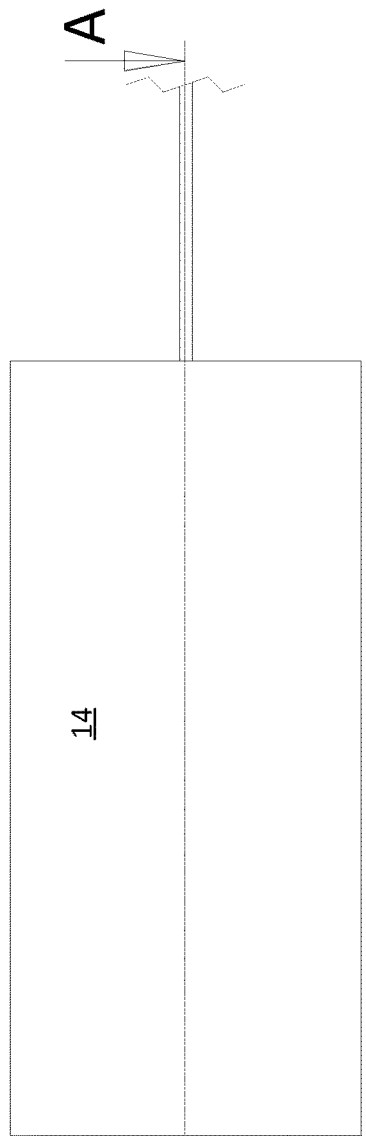
FIG. 6a is a top view of the housing of the robot moving hand of the robot apparatus for operation of an endo-tool on a clinical subject in accordance with the present disclosure.
Figure 6B:
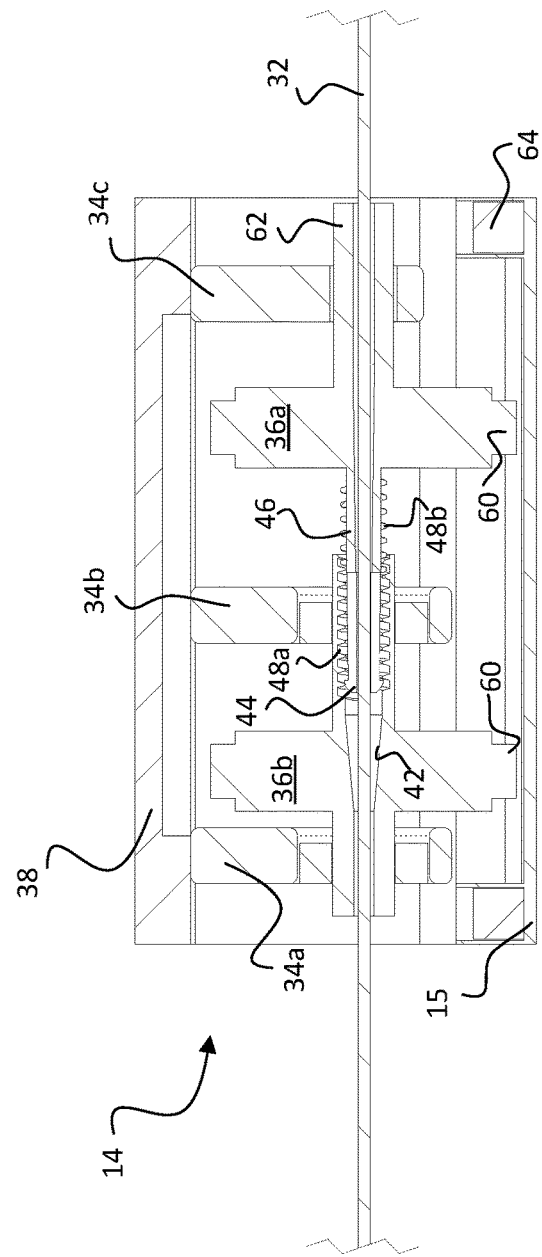
FIG. 6b is a cross-sectional view of the robot moving hand showing the collet in an open position for operation of an endo-tool on a clinical subject in accordance with the present disclosure.
Figure 7:
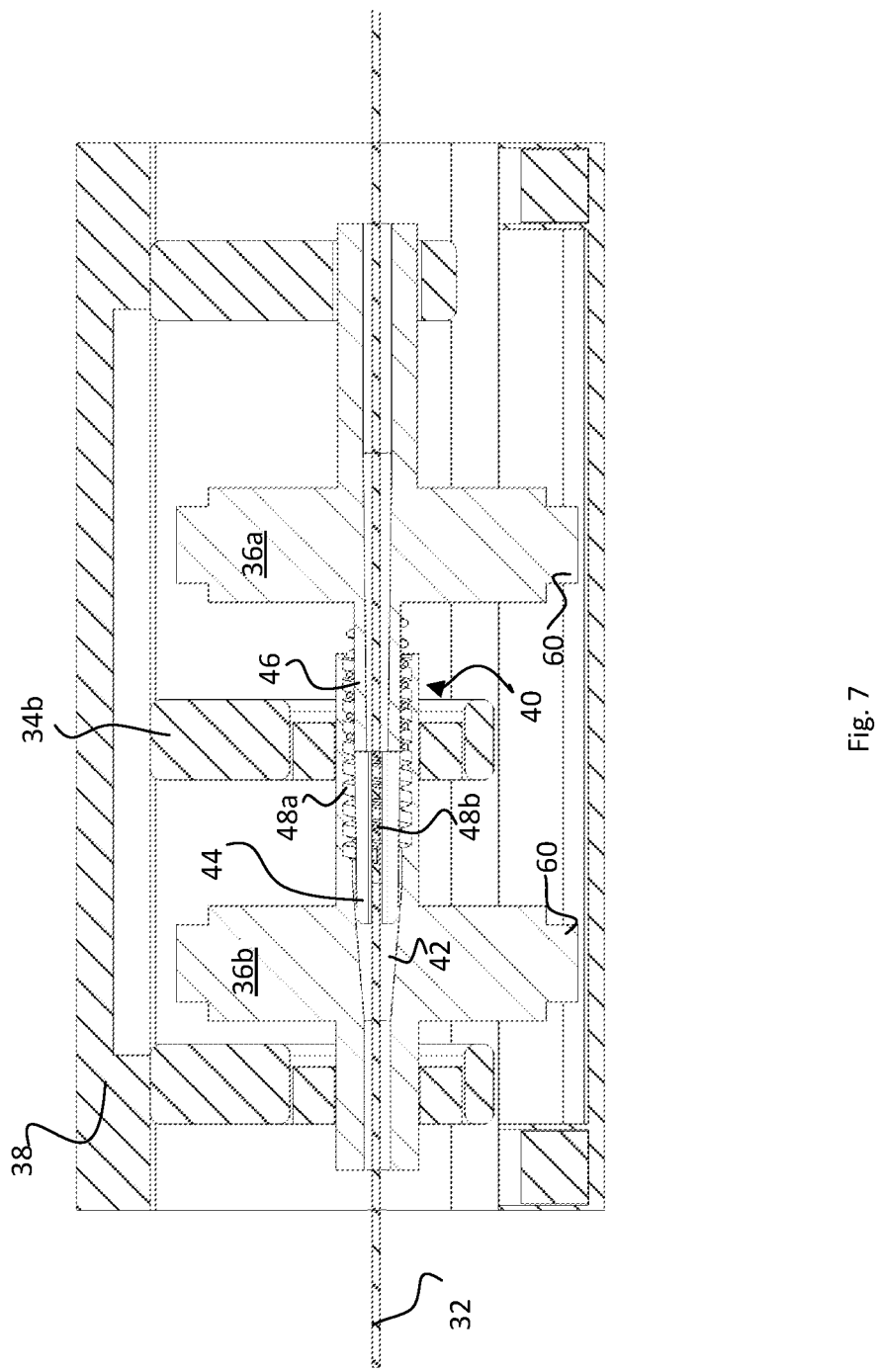
FIG. 7 is a cross-sectional view of the robot moving hand showing the collet in a closed position for operation of an endo-tool on a clinical subject in accordance with the present disclosure.

Reference now is made to FIGS. 6a, 6b, and 7. FIG. 6a is a top view of the housing of the robot moving hand 10 of the robot apparatus 100 for operation of an endo-tool on a clinical subject. FIG. 6b is a cross-sectional view of the robot moving hand 10 showing the collet in an open position for operation of an endo-tool on a clinical subject. FIG. 7 is a cross-sectional view of the robot moving hand 10 showing the collet in a closed position for operation of an endo-tool on a clinical subject, all in accordance with the present disclosure.

Referring to FIGS. 6b and 7, moving hand manipulator 14 further comprises a cylindrical endo-tool bearing 62, in which endo-tool 32 is threaded through robot apparatus 100. Endo-tool bearing 62 is supported by hanger bearings 34a, 34b, and 34c. Moving hand manipulator 14 further comprises a collet chuck 40 nestled between moving hand rotating gear and moving hand holding gear 36b, and supported by hanger bearing 34b.

Collet chuck 40 includes a collet nozzle 42, a collet barrel 46, a collet spindle 48a, a collet inner gear 48b and two or more collet tweezers 44. Endo-tool 32 is threaded through collet barrel 46, collet tweezers 44 and collet nozzle 42, continuing onto endo-tool bearing 62. Collet nozzle 42 is gradually narrower from the front (right) to the back (left). As can be seen in FIGS. 6b and 7, collet barrel 46 has inner threads 48b on one end (towards the front in this example). Collet spindle 48a is positioned inside collet barrel 46 coaxially, having outer thread corresponding to the inner threads and configured to be screw more to the other end (backend in this example) which connects with a structure that has a plurality of collet tweezers 44. When moving hand rotating gear is turned clock-wise, controlled by magnetic driving gear 30, collet inner gear 48b is turned more into collet barrel 46, pushing the two or more collet tweezers 44 more into the gradually narrower collet nozzle 42, forcing them to close upon endo-tool 32, until the two more collet tweezers 44 firmly hold onto endo-tool 32, resulting collet chuck 40 to be at a "closed" position as shown in FIG. 7. Vice versa, when moving hand rotating gear is turned counter clock-wise, controlled by magnetic driving gear 30, collet inner gear 48b is screwed away from collet barrel 46, bringing the two or more collet tweezers 44 away from collet nozzle 42 into the wider area of collet barrel 46, releasing endo-tool 32, resulting collet chuck 40 to be at an "opened" position as shown in FIG. 6b.

Figure 8A:
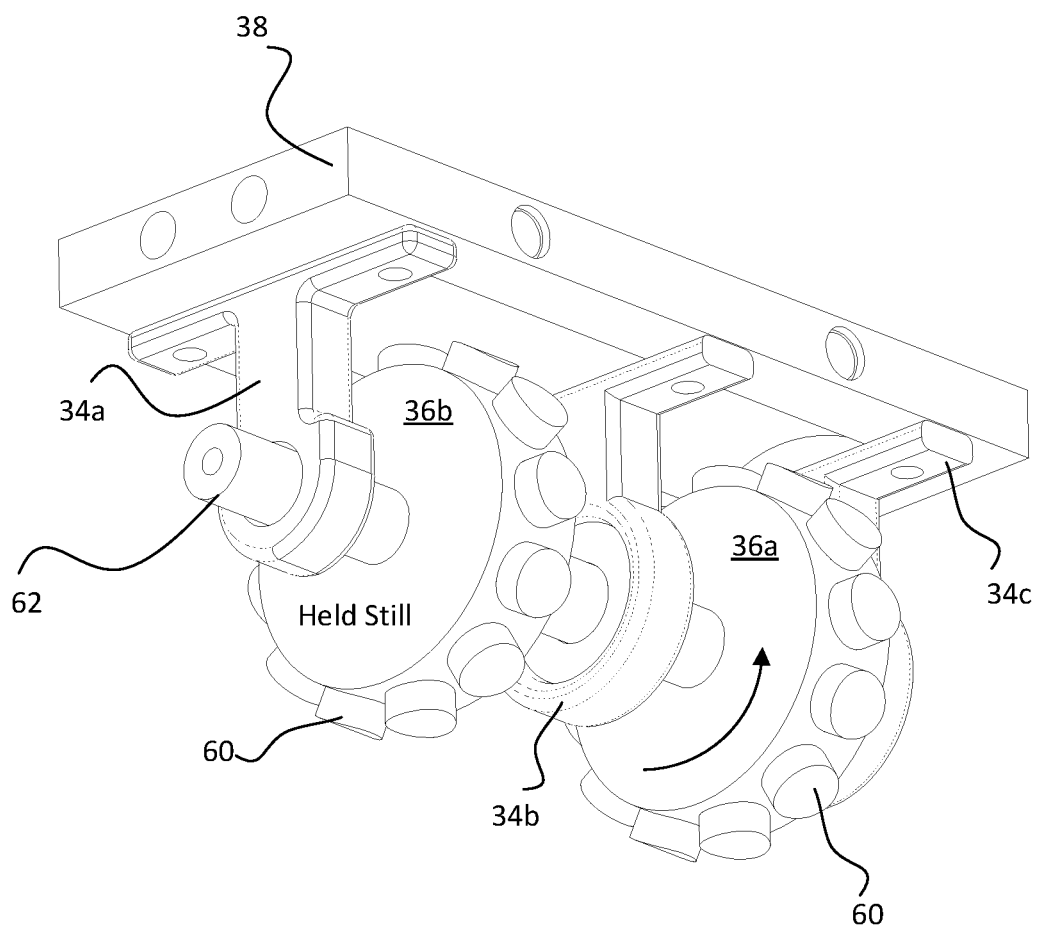
FIG. 8*a* is a perspective view of the robot moving hand showing the open-close operation of the collet of the robot apparatus in accordance with the present disclosure.
Figure 8B:
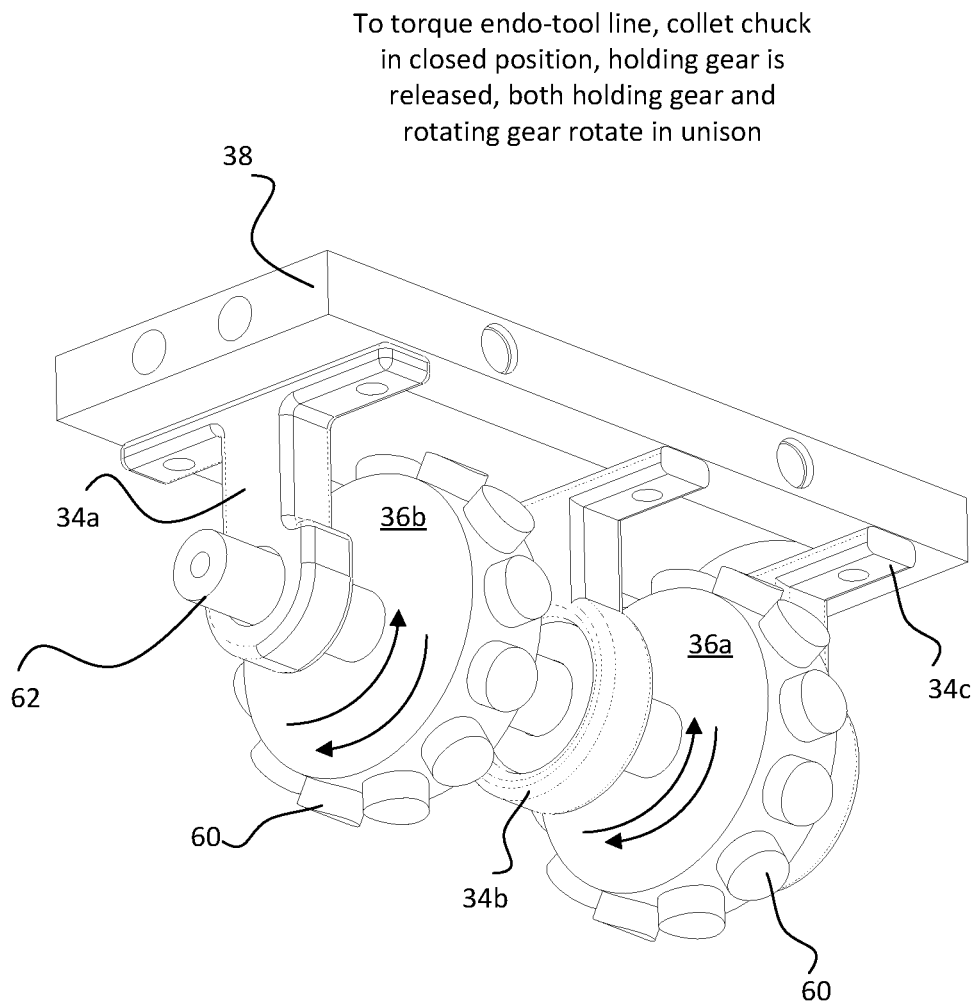
FIG. 8*b* is a perspective view of the robot moving hand showing the rotation of the collet of the robot apparatus in accordance with the present disclosure.

Reference is now made to FIGS. 8a and 8b. FIG. 8a is a perspective view of the robot moving hand 10 showing the open-close operation of the collet of the robot apparatus. FIG. 8b is a perspective view of the robot moving hand showing the rotation of the collet of the robot apparatus in accordance with the present disclosure.

Referring to FIGS. 8a and 8b, with continued reference also made to FIGS. 1 and 7, it should be noted that when it is intended to grab or hold endo-tool 32 or to set collet chuck 40 to from the open to the closed position, moving hand holding gear 36b is held still by switching platform electric magnet 22 to an engaged status. As such, when moving hand rotating gear is turned clock-wise, moving hand holding gear 36b or collet chuck 40 does not move with moving hand rotating gear, resulting collet inner gear 48b being screwed more into collet barrel 46 until the closed position. When it is intended to apply a torque, or to rotate endo-tool 32, and when endo-tool 32 is already grabbed by collet tweezers 44 (or collet chuck 40 is already in "closed" position), moving hand holding gear 36b is released by switching platform electric magnet 22 to an un-engaged status. As a result, the torque can be applied by rotating moving hand rotating gear in either direction and moving hand holding gear 36b follows the moves of moving hand rotating gear in either direction.

As such, moving hand manipulator 14 is configured to achieve holding or releasing, pushing or pulling, and torquing/rotating endo-tool 32 in a simple manner.

Figure 9A:
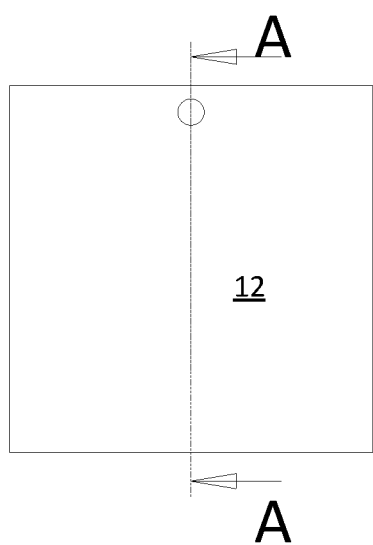
FIG. 9*a* is a side view of the housing of the robot stationary hand of the robot apparatus in accordance with the present disclosure.
Figure 9B:
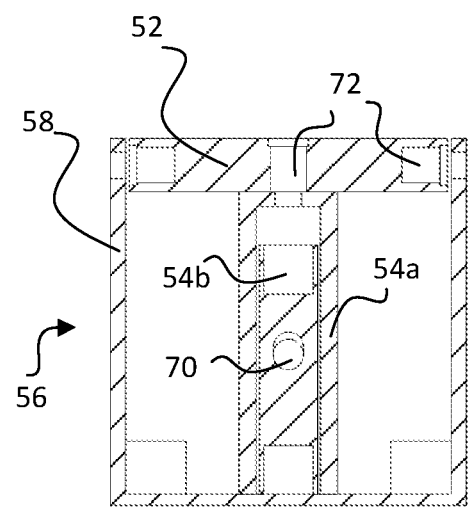
FIG. 9*b* is a cross-sectional view of the robot stationary hand in an open position in accordance with the present disclosure.
Figure 10A:
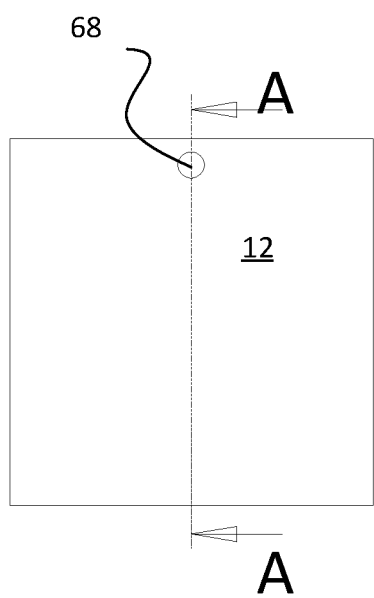
FIG. 10*a* is a side view of the housing of the robot stationary hand of the robot apparatus in accordance with the present disclosure.
Figure 10B:
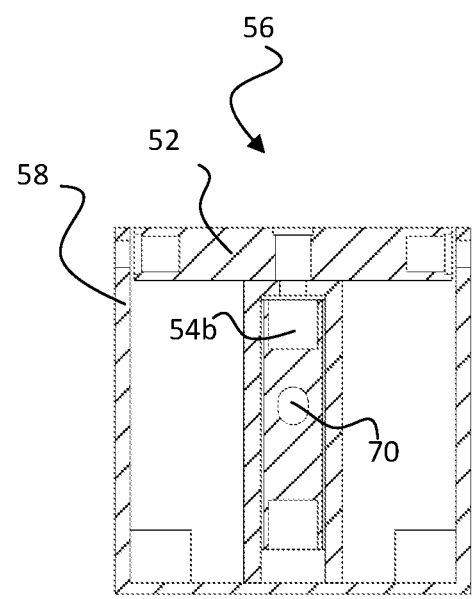
FIG. 10*b* is a cross-sectional view of the robot stationary hand in a closed position in accordance with the present disclosure.

Reference is now made to FIGS. 9a, 9b, 10a, and 10b. FIG. 9a is a side view of the housing of the robot stationary hand of the robot apparatus. FIG. 9b is a cross-sectional view of the robot stationary hand in an open position. FIG. 10a is a side view of the housing of the robot stationary hand of the robot apparatus. FIG. 10b is a cross-sectional view of the robot stationary hand in a closed position, all in accordance with the present disclosure.

As shown in FIGS. 9a, 9b, 10a, and 10b, robot stationary hand 12 comprises a stationary hand electric magnet 50 and a stationary hand manipulator 56. Stationary hand electric magnet 50 is on the non-sterile side and housed by base housing 66. Stationary hand manipulator 56 is on the sterile side and housed by stationary hand clamp housing 58. stationary hand manipulator 56 comprises a stationary hand clamp cylinder 54a, a stationary hand clamp magnet 54b, with stationary hand clamp cylinder 54a supported by stationary hand roof support 52 via 72.

Robot stationary hand 12 is operated by switching stationary hand electric magnet 50 to an engaged status or a disengaged status with the electromagnetic force of stationary hand electric magnet 50 attracting or releasing stationary hand clamp magnet 54b. As a result, stationary hand clamp 70 is moved in stationary hand clamp cylinder 54a to close on endo-tool 32 and hold endo-tool 32, or remove from endo-tool 32 to release endo-tool 32, respectively. See FIGS. 9b and 10b where stationary hand clamp 70 is in an open position and closed position, releasing or holding endo-tool 32 threaded through stationary hand clamp 70, respectively.

Figure 11:
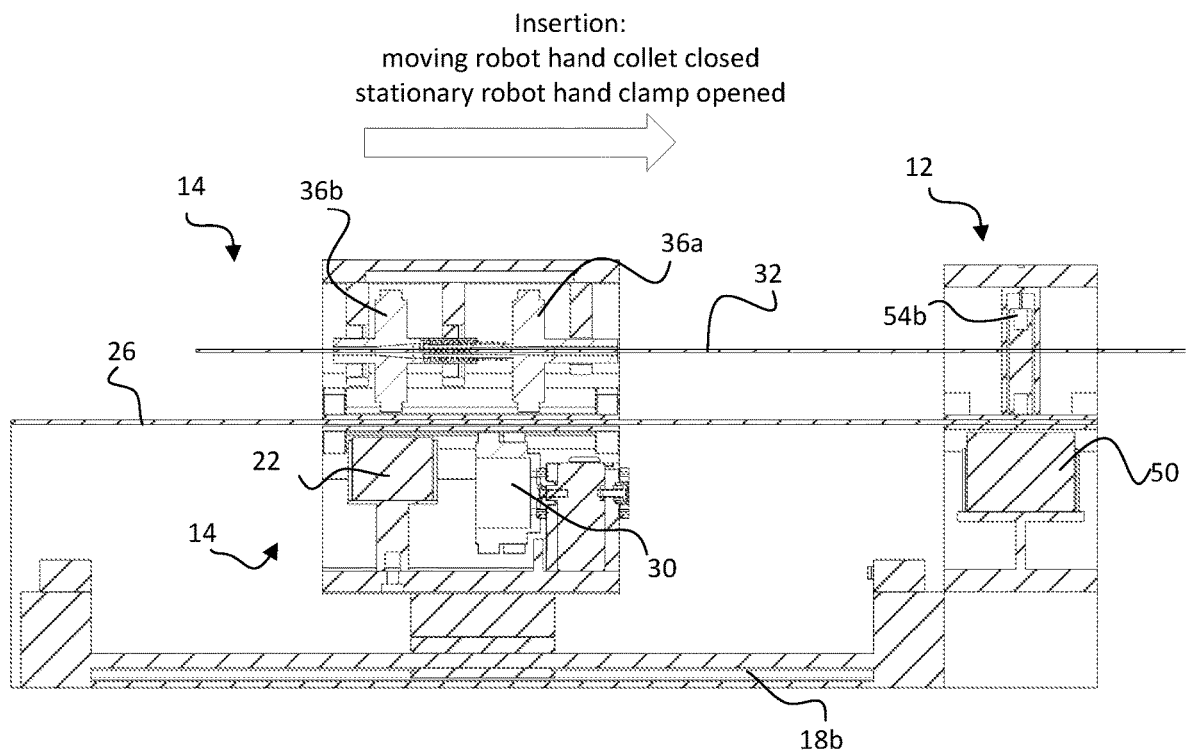
FIG. 11 is a cross-sectional view of the robot apparatus for inserting an endo-tool into a clinical subject in accordance with the present disclosure.
Figure 12:
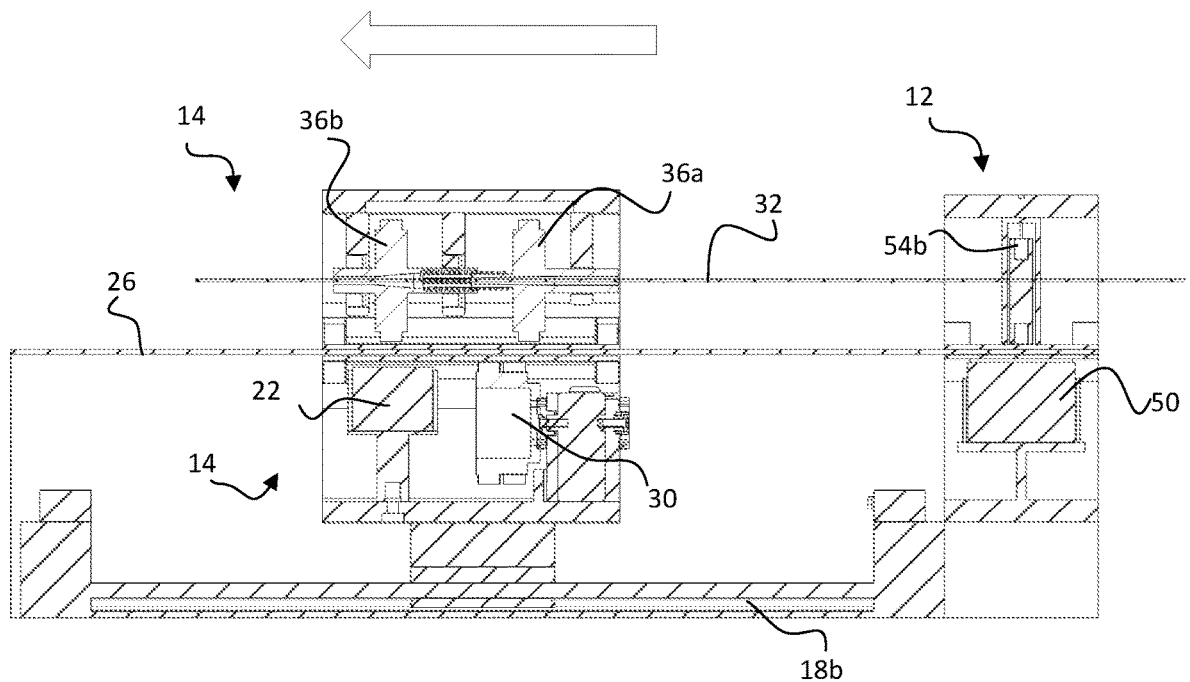
FIG. 12 is a cross-sectional view of the robot apparatus for removing an endo-tool from a clinical subject in accordance with the present disclosure.

Reference is now made to FIGS. 11 and 12. FIG. 11 is a cross-sectional view of the robot apparatus for inserting an endo-tool into a clinical subject. FIG. 12 is a cross-sectional view of the robot apparatus for removing an endo-tool from a clinical subject, all in accordance with the present disclosure.

Referring to FIGS. 11 and 12, with continued reference made to FIG. 7, when collet chuck 40 is at its closed position, endo-tool 32 is held or grabbed by collet chuck 40, and when the entire moving hand manipulator 14 traverses towards the clinical subject by the moving of actuator platform 20 along track 18b from backend track stand 18a to frontend track stand 18c, endo-tool 32 is gradually pushed into the clinical subject for a distance of roughly between backend track stand 18a and frontend track stand 18c.

After actuator platform 20 reaches frontend track stand 18c, one segment of endo-tool 32 is already pushed into the clinical subject, resulting moving hand manipulator 14 being moved closer to robot stationary hand 12. At this moment, in a similar fashion of how an existing manual operation does, robot stationary hand 12 closes stationary hand clamp magnet 54b by engaging stationary hand electric magnet 50, holding and stabilizing endo-tool 32 not moving. At the meanwhile, moving hand manipulator 14 is configured to set collet chuck 40 to be at its open position by the controlling of magnetic driving gear 30, holding one half of collet check 40, releasing endo-tool 32. Subsequently, the entire moving hand manipulator 14 is configured to traverse away from the clinical subject by the moving of actuator platform 20 along track 18b from frontend track stand 18c to back to backend track stand 18a. After actuator platform 20 reaches back to backend track stand 18a, robot apparatus 100 is ready for another cycle of inserting or pushing the next segment of endo-tool 32 into the clinical subject. Then stationary hand 56 is at open position, releasing endo-tool at that point as well and the collet chuck 40 clamps down again on endo-tool 32.

Similar coordination among moving hand manipulator 14 and robot stationary hand 12 applies during the process of removing endo-tool 32 from the clinical subject. That is, during the time that collet chuck 40 is in a closed position to push, pull or torque/rotate endo-tool 32, robot stationary hand 12 (stationary hand clamp magnet 54b) is at the opened position and release endo-tool 32. During the time moving hand manipulator 14 is transferring from one segment of endo-tool 32 to another, collet chuck 40 is in an opened position and release endo-tool 32, and robot stationary hand 12 (stationary hand clamp magnet 54b) is at the closed position holding endo-tool 32, stopping endo-tool 32 from moving and affecting the clinical subject while moving hand manipulator 14 is in transition.

Figure 13:
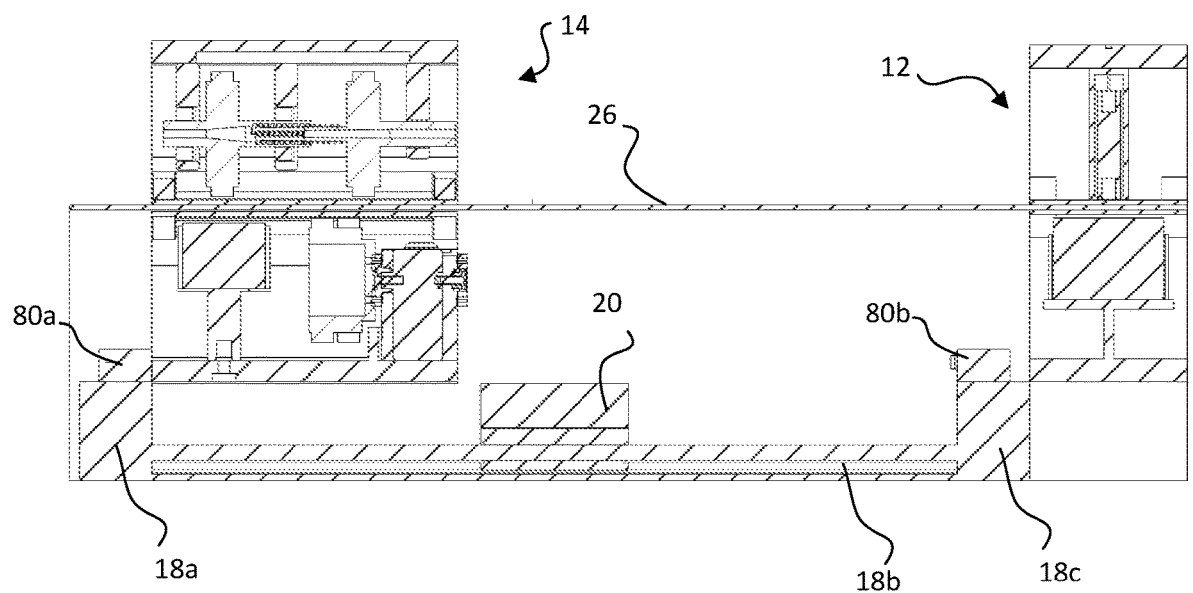
FIG. 13 is a cross-sectional view of the robot apparatus showing an embodiment of sensor trigger positions for the operation of an endo-tool on a clinical subject in accordance with the present disclosure.
Figure 14:
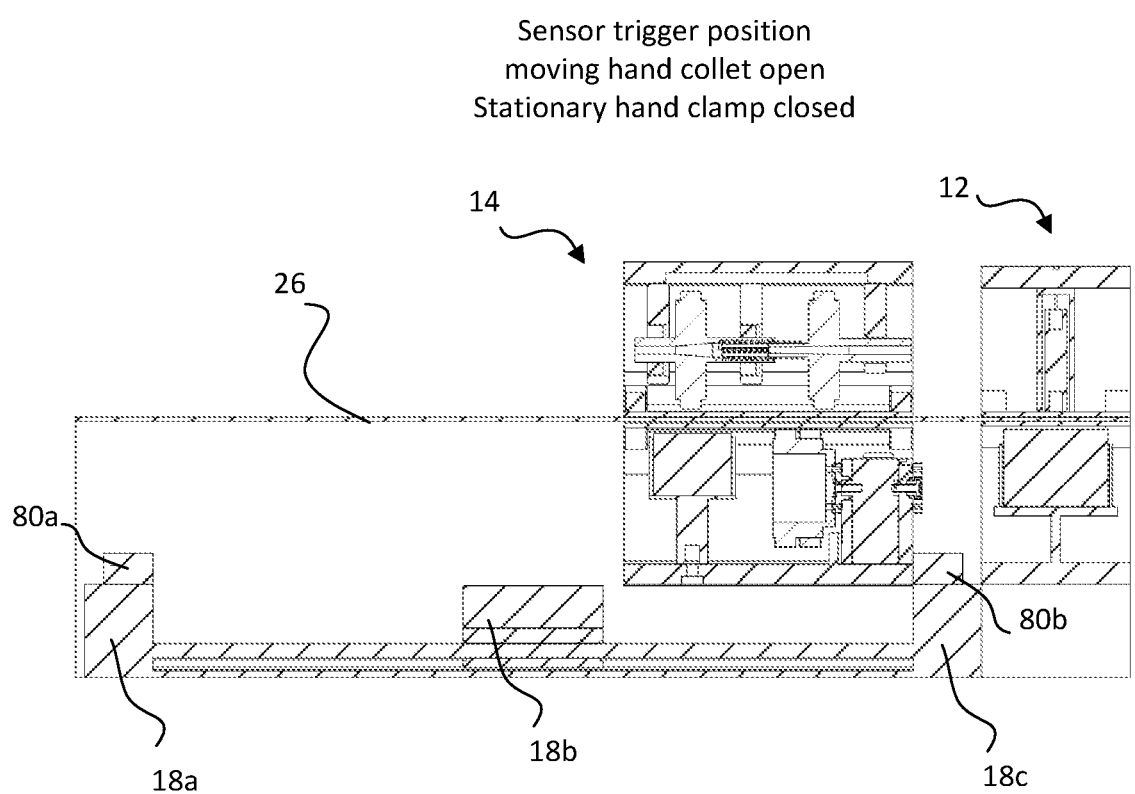
FIG. 14 is a cross-sectional view of the robot apparatus showing another embodiment of sensor trigger positions for the operation of an endo-tool on a clinical subject in accordance with the present disclosure.

Reference is now made to FIGS. 13 and 14. FIG. 13 is a cross-sectional view of the robot apparatus showing an embodiment of sensor trigger positions for the operation of an endo-tool on a clinical subject. FIG. 14 is a cross-sectional view of the robot apparatus showing another embodiment of sensor trigger positions for the operation of an endo-tool on a clinical subject, all in accordance with the present disclosure.

Referring to FIGS. 13 and 14, in an example embodiment, the operation and sequence of movement of elements of robot apparatus 100 are fully or partially controlled by automatic controls, either via wired or wireless controls. robot apparatus 100 therefore further comprise sensors to facilitate the automatic controls.

In an example embodiment, robot apparatus 100 further comprises a backend position sensor 80a and a frontend position sensor 80b, which are configured to sense the presence of actuator platform 20 reaching backend track stand 18a or frontend track stand 18c, respectively. Backend position sensor 80a and frontend position sensor 80b may be the kind of motion sensors based on passive infrared (PIR), ultrasonic, microwave or tomographic detecting energies to measure the distance of actuator platform 20 to backend track stand 18a and frontend track stand 18c, and therefore providing information on how far endo-tool 32 has traveled into the clinical subject. Backend position sensor 80a and frontend position sensor 80b may be the kind of touch sensors such as pressure sensor or light sensor, which provide information when actuator platform 20 reaches backend track stand 18a or frontend track stand 18c.

As shown in FIG. 13, when backend position sensor 80a senses actuator platform 20 reaches backend track stand 18a, robot apparatus 100 is ready for another cycle of inserting or pushing the next segment of endo-tool 32 into the clinical subject. At this moment, magnetic driving gear 30 controls hanger bearing 34a to set collet chuck 40 to be at its closed position, holding endo-tool 32. Actuator platform 20 is controlled to move moving hand manipulator 14 towards frontend track stand 18c. When the entire moving hand manipulator 14 traverses towards the clinical subject by the moving of actuator platform 20 along track 18b from backend track stand 18a to frontend track stand 18c, endo-tool 32 is pushed into the clinical subject for a distance roughly between backend track stand 18a and frontend track stand 18c.

As shown in FIG. 14, when frontend position sensor 80b senses actuator platform 20 reaches frontend track stand 18c, one segment of endo-tool 32 is already pushed into the clinical subject, stationary hand electric magnet 50 is then controlled to close stationary hand clamp magnet 54b by pulling stationary hand clamp magnet 54b to hold and stabilize endo-tool 32 not moving. At the meanwhile, magnetic driving gear 30 is controlled to set collet chuck 40 to be at its open position, releasing endo-tool 32. Subsequently, actuator platform 20 is controlled to move moving hand manipulator 14 to traverse away from the clinical subject by along track 18b from frontend track stand 18c to back to backend track stand 18a.

Robot apparatus 100 may also comprise other sensors enabling automatic control to control the coordination among moving hand manipulator 14 and robot stationary hand 12. For example, during the process of removing endo-tool 32 from the clinical subject. That is, during the time that collet chuck 40 is in a closed position to push, pull or torque/rotate endo-tool 32, robot stationary hand 12 (stationary hand clamp magnet 54b) is at the opened position and release endo-tool 32. During the time moving hand manipulator 14 is transferring from one segment of endo-tool 32 to another, collet chuck 40 is in an opened position and release endo-tool 32, and robot stationary hand 12 (stationary hand clamp magnet 54b) is at the closed position holding endo-tool 32, stopping endo-tool 32 from moving and affecting the clinical subject while moving hand manipulator 14 is in transition.

Figure 15:
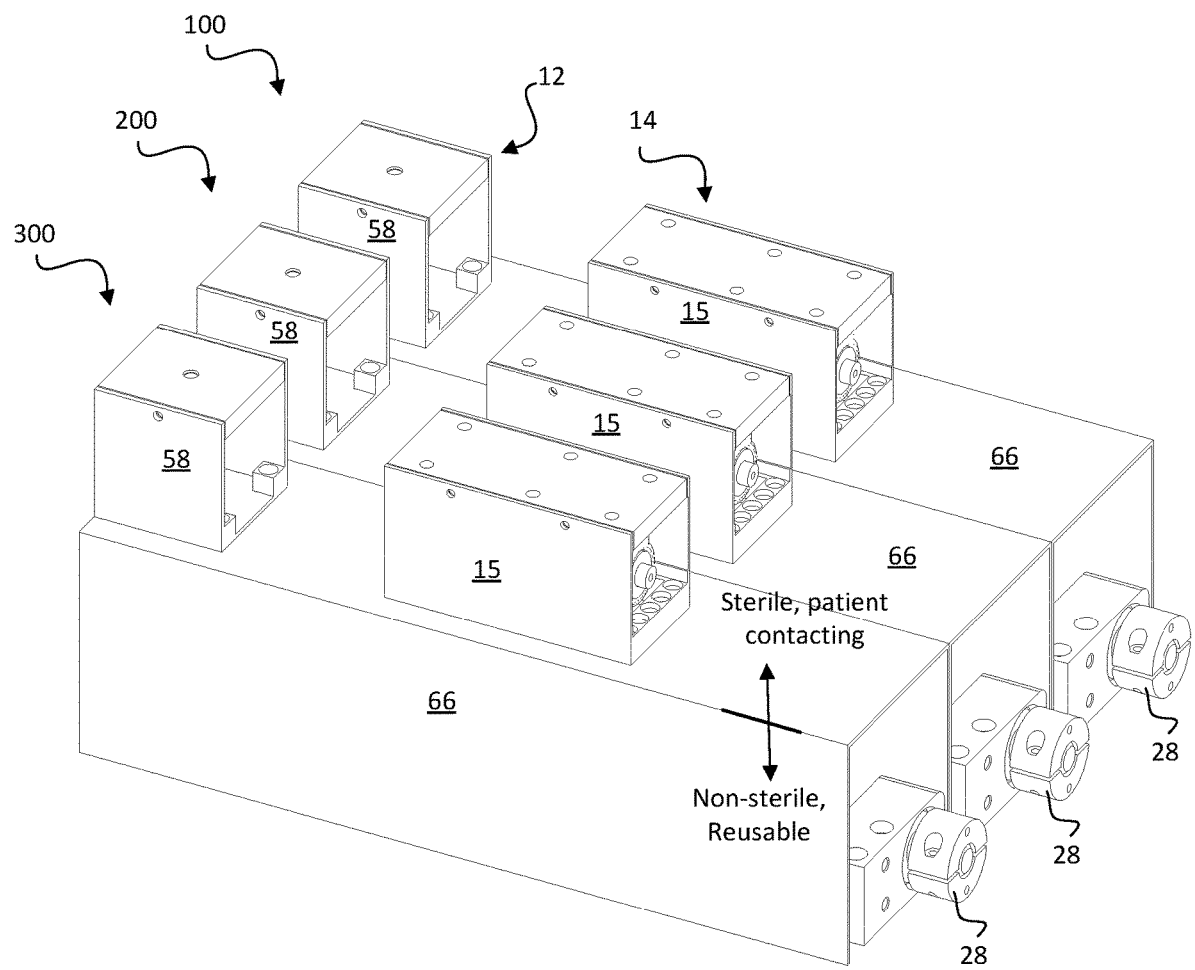
FIG. 15 is an exploded-perspective view of the robot apparatus showing an embodiment with multiple pairs of robot moving hand and robot stationary hand for the operation of multiple endo-tools on a clinical subject in accordance with the present disclosure.

FIG. 15 is an exploded-perspective view of the robot apparatus showing an embodiment with multiple pairs of robot moving hand and robot stationary hand for the operation of multiple endo-tools on a clinical subject in accordance with the present disclosure.

Due to the simplistic configuration of robot apparatus 100, clinically, there is enough space clinically to arrange multiple pairs of similar robot apparatus, such as 200 and 300 by an operation bed as shown in FIG. 15. The configuration of 200 and 300 can be the same or similar to robot apparatus 100. As a result, multiple endo-tools, such as catheters carrying surgical devices, diagnostic sensors, medicine, etc. can be inserted into or removed from the clinical subject, all during the same surgical procedure.

It can be appreciated that the operation of robot apparatus 100 can also be perform by any combination of human operation and automation. For example, the operation of hanger bearing hanger bearing 34a and hanger bearing 34b can be done remotely by a human holding a remote controller while the movement of actuator platform 20 can be done automatically. All such alternative embodiments are in the scope of the present disclosure.

In yet another alternative embodiment, collet chuck 40 is controlled by two magnetic gear drives like magnetic driving gear 30, instead of one magnetic gear drive and an electromagnet. All such alternative embodiments are in the scope of the present disclosure.

Additionally, it is contemplated that systems, devices, methods, and processes of the present application encompass variations and adaptations developed using information from the embodiments described in the following description. Adaptation or modification of the methods and processes described in this specification may be performed by those of ordinary skill in the relevant art.

Throughout the description, where compositions, compounds, or products are described as having, including, or comprising specific components, or where processes and methods are described as having, including, or comprising specific steps, it is contemplated that, additionally, there are articles, devices, and systems of the present application that consist essentially of, or consist of, the recited components, and that there are processes and methods according to the present application that consist essentially of, or consist of, the recited processing steps.

It should be understood that the order of steps or order for performing certain action is immaterial so long as the described method remains operable. Moreover, two or more steps or actions may be conducted simultaneously.

What is claimed:

1. A robot apparatus comprising:
   a robot moving hand configured to move linearly towards or away from a clinical subject, the robot moving hand further comprising:
   a moving hand actuator including an electromagnetic device comprising a permanent magnetic driving gear and an electromagnet, the permanent magnetic driving gear being perpendicularly aligned with the electromagnet, and the electromagnetic device is controlled by a surgical operator at a distance;
   a manipulator configured to maneuver an endo-tool to be inserted into or withdrawn from the clinical subject, the manipulator being electromagnetically controlled by the moving hand actuator in a contactless manner;
   a robot stationary hand being linearly stationed between the clinical subject and the robot moving hand, the robot stationary hand having a clamp to either hold or release the endo-tool being passed through the clamp, the clamp being magnetically coupled to and controlled by the stationary hand actuator contactlessly in such way that the robot stationary hand releases the endo-tool while the manipulator of the robot moving hand holds and maneuvers the endo-tool to be inserted or withdrawn from the clinical subject;
   a sterile barrier configured to separate a sterile side from a non-sterile side, wherein, the moving hand actuator, the stationary hand actuator are on the non-sterile side, and the manipulator and the clamp are on the sterile side.

2. The robot apparatus of claim 1, wherein the moving hand actuator comprises at least one magnetic driving gear and the manipulator comprises at least one magnetic manipulation gear corresponding to the at least one magnetic driving gear.

3. The robot apparatus of claim 1, wherein the manipulator comprises a moving hand rotating gear and a moving hand holding gear.

4. The robot apparatus of claim 3, further comprising a collet chuck between the moving hand rotating gear and the moving hand holding gear, wherein the endo-tool is threaded through the collet chuck, and the collet chuck is manipulated by the moving hand rotating gear and the moving hand holding gear to set the collet chuck to a closed or open position to hold or release the endo-tool correspondingly.

5. The robot apparatus of claim 4, wherein the collet chuck further comprises a collet barrel having inner threads on one end of the collet barrel, a collet spindle positioned inside the collet barrel coaxially, the collet spindle having outer threads near one end of the collet spindle corresponding to the inner threads and configured to be screwed more either toward or away from an other end of the collet spindle, the collet spindle extends in shapes of two or more collet tweezers at the other end of the collet spindle, resulting the two or more collet tweezers to be pushed into or pulled away from a collet nozzle, the collet nozzle being placed inside and on the other end of the collet barrel, and further resulting in the collet tweezers to hold or release the endo-tool, respectively.

6. The robot apparatus of claim 1, wherein the manipulator comprises a moving hand rotating gear, a moving hand holding gear, and a collet chuck, and wherein the moving hand holding gear is held still while the moving hand rotating gear is rotated to open or close the collet chuck to hold or release the endo-tool.

7. The robot apparatus of claim 6, wherein when the collet chuck is in a closed position holding the endo-tool and the moving hand holding gear is released free, the moving hand rotating gear is configured to rotate and torque the endo-tool.

8. The robot apparatus of claim 7, wherein when the collet chuck is in the closed position holding the endo-tool and the moving hand holding gear is released free, the robot moving hand rotating gear is configured to push or pull the endo-tool.

9. The robot apparatus of claim 1 is further configured to such that the robot stationary hand holds the endo-tool still while the manipulator of the robot moving hand releases the endo-tool to allow the robot moving hand to move linearly towards or away from the clinical subject.

10. The robot apparatus of claim 1 further comprises a track positioned linearly to facilitate the robot moving hand configured to be moved linearly towards or away from the clinical subject.

11. The robot apparatus of claim 1 further comprises two or more position sensors to sense the robot moving hand reaches a front end or a back end.

12. The robot apparatus of claim 11 is further configured such that the robot stationary hand holds the endo-tool not moving while the manipulator of the robot moving hand releases the endo-tool to allow the robot moving hand to move linearly towards or away from the clinical subject when one of the two or more position sensors senses the robot moving hand reaches the front end or the back end.

13. The robot apparatus of claim 1, wherein the endo-tool is in a shape of a catheter.

14. The robot apparatus of claim 1, wherein the endo-tool is in a shape of a guidewire.

* * * * *